C. ENDORF, Jr.
MILKING MACHINE.
APPLICATION FILED AUG. 14, 1918.
1,398,368.
Patented Nov. 29, 1921.
3 SHEETS—SHEET 3.
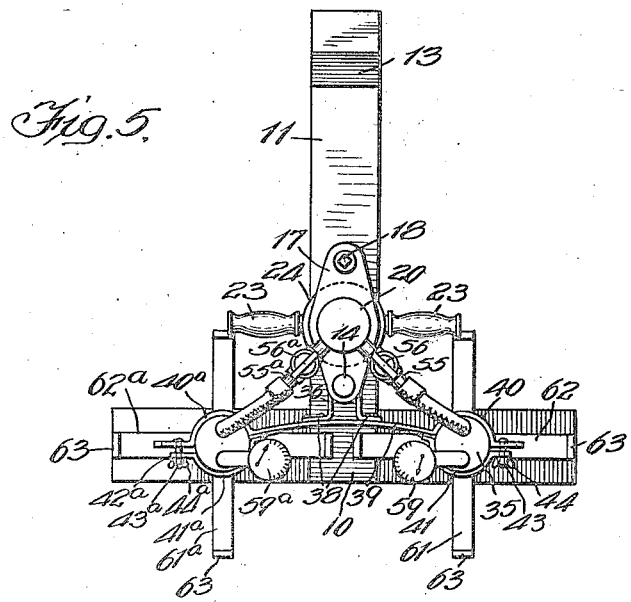
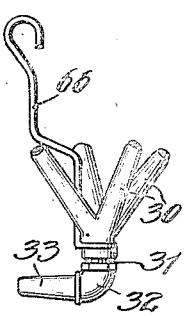
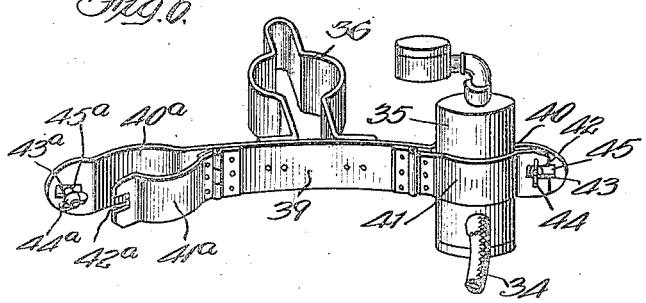
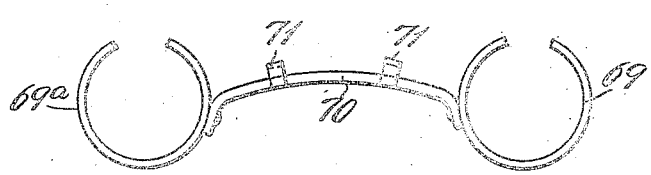
WITNESSES:
INVENTOR

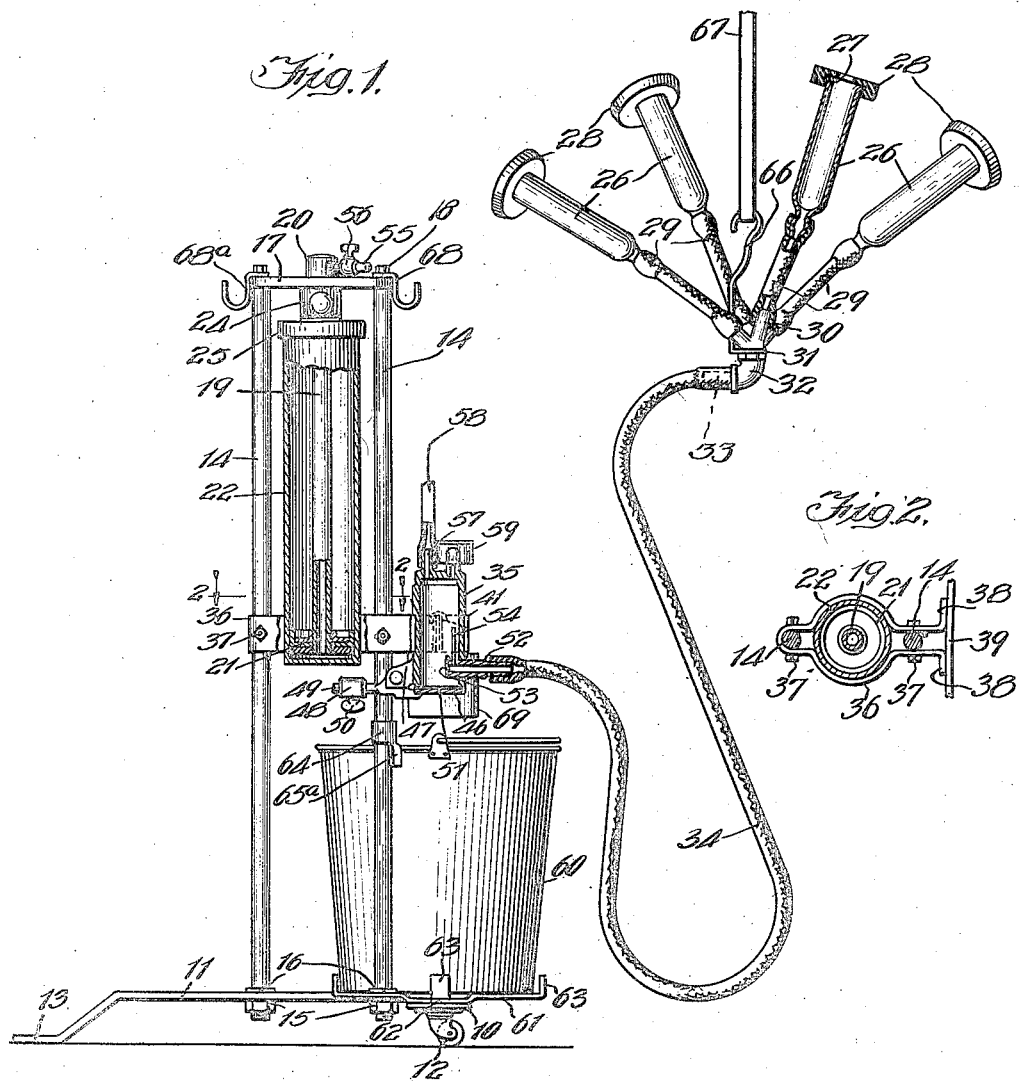

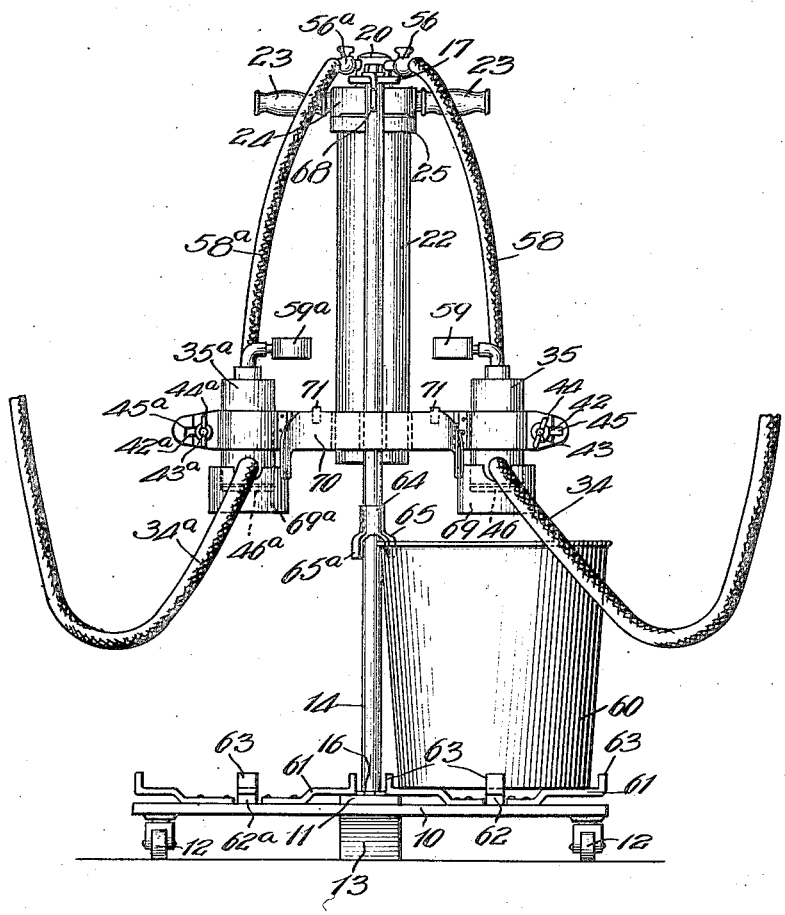

UNITED STATES PATENT OFFICE.

CHARLES ENDORF, JR., OF CHICAGO, ILLINOIS, ASSIGNOR TO THE BURTON PAGE COMPANY, OF CHICAGO, ILLINOIS, A CORPORATION OF ILLINOIS.

MILKING-MACHINE.

1,398,368.         Specification of Letters Patent.         Patented Nov. 29, 1921.

Application filed August 14, 1918. Serial No. 249,790.

*To all whom it may concern:*

Be it known that I, CHARLES ENDORF, Jr., a citizen of the United States, residing at Chicago, in the county of Cook and State of Illinois, have invented certain new and useful Improvements in Milking-Machines, of which the following is a specification.

My invention relates to apparatus for milking cows, and more particularly to milking machines of the general type disclosed in patent of Peter A. Frimand, No. 1,311,959, granted August 5, 1919. In this type of machine an exhausting apparatus is provided for exhausting the air from the teat cups. This apparatus is furnished with a discharge opening to the atmosphere for the outflow of milk which is closed during the suction periods by a valve, the valve opening automatically to discharge the milk into a suitable receptacle arranged under the pumping apparatus. The exhausting apparatus is operated by hand so that the recurring suction impulses may be controlled and governed by the operator. In the first place, it is possible, in a milking machine so constructed, by a quick movement of the pump or exhausting apparatus during the first part of its stroke, to bring the vacuum in the teat cups very quickly to its maximum intensity after which the operating member of the pump is moved just fast enough to keep the vacuum at the desired intensity to the end of the stroke. As a result of this the machine may be operated so that its effect on the cow resembles very closely hand milking or the action of the calf's mouth on the teats of the cow. Furthermore, there is an economy of power, due to the fact that during practically the entire stroke of the pump the vacuum produced is a milking vacuum. Besides this, it is not necessary to raise the vacuum to an abnormally high point at any part of the stroke, which is one of the objections to milking machines in which the pump operates directly on the cow's teats instead of indirectly through the instrumentality of a pulsator. In the second place, the control by hand of the exhausting apparatus makes it possible for the operator to vary the operation of the machine according to the particular animal being milked; which is a matter of considerable importance as one of the principal objections to most milking machines is that they do not take into account the characteristics of different cows.

This invention has for its principal object to provide certain improvements in a milking machine of the type indicated; although it will be realized that these improvements are not to be considered as limited exclusively to a milking machine of this particular type.

The invention is illustrated, in the preferred embodiment, in the accompanying drawings, wherein—

Figure 1 is a side elevation of the machine with certain parts in section.

Fig. 2 is a sectional plan on line 2—2 of Fig. 1.

Fig. 3 is a front elevation of the machine.

Fig. 4 is a fragmentary vertical sectional view of one of the milk receiving chambers.

Fig. 5 is a plan view of the same.

Fig. 6 is a detail view illustrating the preferred manner of mounting the milk receiving chambers on the supporting framework of the machine.

Fig. 7 is a plan view of the device for preventing the splashing of the milk when delivered from the milk chambers, and Fig. 8 is a view, in elevation, of the device for supporting the teat cups.

Like characters of reference designate like parts in the several figures of the drawings.

The operative elements of the machine are supported on a base consisting, preferably, of a transverse member 10, and a longitudinal member 11, the former being provided with casters 12 and the latter being formed, at its outer extremity, with a bend which provides a footpiece 13 adapted to rest upon the floor. Supported on the longitudinal member 11 is a pair of uprights 14. The lower ends of the uprights are preferably threaded and secured to the base member 11 by nuts 15, 16; this being for the purpose of allowing the machine to be taken down for shipment. The uprights 14 are connected by a crosspiece 17, the connection being made preferably by screws 18. 19 is a hollow piston rod, the stationary member of the exhaust pump, the upper end of which is threaded through the crosspiece 17, and 20 a hollow cap screwed onto the end of the piston rod so as to hold the same firmly to the crosspiece 17. The lower end of the piston rod is provided with a piston 21. The cylinder 22 of the pump reciprocates, and for this purpose is provided with a pair of handles 23 attached to opposite ends of a guide web 24 extending across and forming a part of a ring 25 secured to the upper end of the cylinder, the web 24 being formed with an opening for the piston rod 19. The upper end of the cylinder is open and the lower end of the cylinder is closed.

The machine shown is designed for milking two cows by means of the same pump 19, 22. The machine is therefore provided with two sets of apparatus, one arranged on each side thereof. It will be sufficient to describe the apparatus on the right-hand side of the machine, viewed from the front (Fig. 3). In the drawings, the corresponding parts on the other side of the apparatus are indicated by the same reference numerals but with the exponent a.

The teat cups 26 are preferably made of metal with flaring lips 27 and are provided with the usual rubber diaphragms 28. The teat cups are connected by flexible rubber tubes 29 with the nipples of a cluster casting 30. In this structure the nipples are united at the bottom and diverge upwardly and outwardly from their point of juncture. The cluster casting 30 is formed with a threaded stem 31 on which is screwed an elbow 32 having a nipple 33 for a piece of flexible tubing 34 connecting the teat cups with the milk receiving chamber 35. The milk receiving chamber 35, and the corresponding chamber 35$^a$ on the other side of the machine, are preferably held in clamped arrangement with the supporting frame of the machine so that they may be readily removed for the purpose of cleansing. 36 is a sheet steel bracket which extends around the uprights 14 and the pump cylinder 22, and is bolted to the former as shown at 37. To the extremities 38 of the bracket 36 is riveted a metal strip 39, the ends of which are curved as indicated at 40, 40$^a$. The milk receiving chambers 35, 35$^a$ fit into these curved portions and are clamped to the strip by hinged clamping straps 41, 41$^a$, the extremities of which are notched at 42, 42$^a$ so as to be engaged by bolts 43, 43$^a$ and thumb nuts 44, 44$^a$, the bolts passing loosely through openings 45, 45$^a$ in the member 39.

The milk receiving chamber 35 has an open bottom designed to be closed during the suction periods by a flap valve 46 pivoted between ears 47 formed on the chamber. The valve preferably is counterweighted by the weight 48 which may be adjustably secured to the stem 49 by set screw 50. The valve is preferably provided with a rubber or other resilient facing 51 adapted to bear against the lower edge of chamber 35. The counterweight will ordinarily be positioned so as to keep the valve normally closed, or at least close to its seat against the bottom of chamber 35. The flexible tube 34 is connected with a nipple 52 which projects into the chamber, the inner end being closed normally by a flap valve 53. Extending upwardly from the nipple, within the chamber, is a relief pipe 54 of relatively small diameter. This pipe is open at the top. The cap 20 on the end of the piston rod 19 of the exhaust pipe is provided with a nipple 55, with which preferably is associated a stop cock 56, nipple 55 being connected with a nipple 57 on the top of the milk chamber by a flexible tube 58. 59 is a vacuum gage arranged on the milk receiving chamber to indicate the state of the pressure in the chamber when the pump is operated.

The receptacle in which the milk discharged from the milk receiving chamber 35 is received, an ordinary milk pail being shown in the drawings at 60, is arranged on the base member below the milk receiving chamber. A support for the pail is provided by the crossed strips 61, 62, the extremities of which are turned up to form lips 63. In order to hold the pail against disturbance when the pump is operated, I provide, on one of the uprights 14, a sliding ring 64 having a pair of lips 65, 65$^a$, one lip being adapted to engage the pail at one side of the machine, and the other at the other side.

The cluster casting 30 is supported on the cow by means of a hook 66 engaging a surcingle 67. A pair of hooks 68, 68$^a$ are preferably provided for supporting the teat cup connecting pipes and the teat cups when the machine is not in use. These hooks are shown as secured to the crosspiece 17 by the bolts 18 above referred to.

In order to prevent the milk discharged from the milk receiving chambers from splashing out of the pails, I provide a pair of arcuate shield members 69, 69$^a$, each extending partially around one of the milk receiving chambers. The shield members are connected by a strip 70 provided with clips 71, for engaging the member 39 on which the milk receiving chambers are supported.

*Operation.*—In a milking machine adapted to be operated by a hand pump, there is more difficulty, where the milking is done by a single operator, in attaching the teat cups to the cow's teats than in a power machine in which the vacuum pump may be started before the attachment is made. The arrangement herein shown obviates any difficulty in this regard. By having the teat cups connected by relatively short rubber tubes with the nipple cluster 30, the nipples of which extend, generally speaking, in an upwardly direction, the teat cups will stand in a position sufficiently erect so that they may be applied one by one to the teats of the cow without danger that one will fall out of position while the other is being put into place. After the teat cups have been adjusted the operator grasps the handles 23, steadying the machine by putting one foot on the longitudinal base member 11 and depresses the pump cylinder 22. This produces a partial vacuum in the milk receiving chamber 35 connecting pipe 34 and the teat cups 26 which withdraws the milk from the cow into the chamber 35. Valve 46 is kept closed because of the low pressure in the milk receiving chamber, and by means of counterweight 48 the position may be adjusted as required. The proper method of operation is to depress the pump cylinder quite rapidly at first until what may be termed a milking vacuum is obtained, that is, a suction of sufficient intensity to draw the milk from the cow's udder. After this the cylinder is depressed just fast enough to maintain the milking vacuum and thereby keep up the steady flow of the milk. The maximum intensity of the suction created may be varied, and will ordinarily be varied according to the particular animal being milked. Similarly the length of the stroke of the pump may be varied in the discretion of the milker. The machine has a flexibility and adaptability to the requirements of the particular case which are wholly wanting in the ordinary power milking machines or in hand milking machines in which the movable element of the pump has a stroke of definite length. When the pump cylinder is raised the vacuum in the milk receiving chamber disappears and, in fact, there will ordinarily be some back pressure at the upper end of the return stroke. This, and the weight of the milk in the milk receiving chamber opens valve 46 and the milk is discharged into the pail 60.

It will be observed that the inlet nipple 52 leading into the milk receiving chamber from the teat cups is provided with an inwardly opening valve 53. This valve hangs loosely enough so that it allows the free flow of milk from pipe 34 into the chamber. On the other hand, in case of any appreciable amount of pressure above atmospheric pressure created in the milk receiving chamber on the return stroke, which may be due, for example, to wrong adjustment of counterweight 48, back pressure against the cow's teats through pipe 34 is prevented. The pipe 54 prevents low pressure in the teat cups on the return stroke of the pump but its cross-sectional area is small in comparison with the diameter of the opening closed by valve 53 so that the air pressure which may enter the teat cup connection therethrough, in the case of abnormally high pressure in the milk receiving chamber, is negligible.

I claim:

1. In a milking machine, the combination of a supporting structure having a base to sustain a milk receptacle and an upright member, a pump on said supporting structure, an udder attachment, milk receiving means having connections to said pump and udder attachment, and a support for the milk receiving means adapted to be fixed adjustably to said upright member.

2. In a milking machine, the combination of a supporting structure adapted to sustain a milk receptacle, a hand operated pump on said structure, an udder attachment, means providing a milk receiving chamber connected with said pump and udder attachment, and a device engageable with said supporting structure for holding said milk receiving means in place over the milk receptacle.

3. In a milking machine, the combination of a pump and udder attachment, means providing a milk receiving chamber connected with said pump and udder attachment, a supporting structure comprising a base adapted to hold a milk receptacle, an upright member to which the pump is secured, and a support on said upright member which holds the milk receiving chamber over said milk receptacle.

4. In a milking machine, the combination with teat cups and teat cup connections, of apparatus for exhausting the air from said connections and cups in recurring pulsations comprising a milk receiving chamber, a substantially vertical exhaust pump which produces suction on the down stroke and which is operated by hand thereby permitting variations in the length and rapidity of the strokes.

5. A milking machine of the type operating to withdraw milk from the cow by suction and to discharge the same to a receptacle at atmospheric pressure, comprising in combination a milk receiving chamber adapted to be associated with said receptacle, a cluster of teat cups, a flexible conduit through which the milk passes from the teat cups to the milk receiving chamber and means for creating a partial vacuum in said chamber, conduit and cups, comprising a pump consisting of piston and cylinder members one of which is movable with respect to the other and is provided with means for operating it by hand whereby the length of its stroke may be varied by the operator to vary the intensity of each suction impulse applied to the cow's udder and a pressure indicator within the view of the operator to indicate the intensity of the vacuum created at each stroke of the pump.

6. A milking machine of the type operating to withdraw milk from the cow by suction and to discharge the same to a receptacle at atmospheric pressure comprising in combination a milk receiving chamber adapted to be associated with said receptacle, a cluster of teat cups, a flexible conduit through which the milk passes from the teat cups to said chamber and means for gradually creating a partial vacuum in said chamber, conduit and cups, comprising a pump arranged in substantially upright position and consisting of piston and cylinder members one of which is movable downwardly to create a suction and is provided with means for operating it by hand, whereby the length of its stroke may be varied by the operator to vary the intensity of each suction impulse applied to the cow's udder.

7. A milking machine of the type operating to withdraw milk from the cow by suction and to discharge the same to a receptacle at atmospheric pressure comprising in combination a milk receiving chamber adapted to be associated with said receptacle, a cluster of teat cups, a flexible conduit through which the milk passes from the teat cups to said chamber and means for gradually creating a partial vacuum in said chamber, conduit and cups, comprising a pump arranged in substantially upright position and consisting of piston and cylinder members one of which is movable downwardly to create a suction and is provided with a pair of handles one at each side for operating the same by hand whereby the length of its stroke may be varied by the operator to vary the intensity of each suction impulse applied to the cow's udder.

8. In a milking machine, the combination of teat cups, a milk receiving chamber having an opening in the bottom, a connection from the teat cups to the chamber, exhausting apparatus for exhausting the air from the chamber, a valve to close the opening in the bottom of the chamber which automatically operates to permit the discharge of milk therefrom, a valve to prevent back pressure from the chamber into said teat cup connection, and a pipe of relatively small bore extending upwardly from said teat cup connection within the chamber open at the top for the purpose of breaking the vacuum in the teat cups.

9. In a milking machine, the combination of teat cups, a milk receiving chamber with which teat cups are connected, a hand operated exhaust pump of variable stroke for exhausting the air from said chamber, and a pressure gage to indicate the condition of pressure in the milk receiving chamber while the pump is being operated.

10. In a milking machine, the combination of a supporting structure, a milk receiving chamber associated with said structure and open at the bottom, teat cups connected with said chamber, a valve to close the lower end of the milk receiving chamber adapted to automatically open to discharge the milk, a hand operated exhaust pump associated with said supporting structure for exhausting the air from said chamber, and means on said supporting structure for supporting and engaging a milk receptacle when placed under said milk receiving chamber.

11. In a milking machine, the combination of a supporting structure, a milk receiving chamber associated with said structure and open at the bottom, teat cups connected with said chamber, a valve to close the lower end of the milk receiving chamber adapted to automatically open to discharge the milk, a hand operated exhaust pump mounted on said supporting structure for exhausting the air from said chamber, means on said supporting structure for supporting and engaging a milk receptacle when placed under said milk receiving chamber, and a curved shield plate extending around and spaced from the lower end of the milk receiving chamber.

12. In a milking machine, the combination with a supporting structure, a milk receiving chamber associated with said structure and open at the bottom, teat cups connected with said chamber, a valve to close the lower end of the milk receiving chamber adapted to automatically open to discharge the milk, a hand operated exhaust pump mounted on said supporting structure, upright members for sustaining the pump, means on said supporting structure adapted to receive and support a milk pail under said milk receiving chamber, and a clip slidably arranged on one of said uprights adapted to engage the edge of the milk pail.

13. In a milking machine, the combination of a supporting structure, teat cups, a milk receiving chamber associated with said structure and with which said teat cups are connected, an exhausting apparatus associated with said structure for exhausting the air from said chamber, and clamping means for clamping the milk receiving chamber to said structure so that it may be readily removed therefrom.

14. In a milking machine, the combination of an udder attachment, an exhausting apparatus adapted to produce intermittent suction impulses, a milk receiving chamber connected with said exhausting apparatus and udder attachment from which and the udder attachment substantially all of the milk is discharged automatically between each suction impulse of the exhausting apparatus, said exhausting apparatus comprising piston and cylinder elements, one of which is stationary and the other of which has a relatively long stroke and is capable of movement by the operator of the machine for variable distances and at veriable speeds, for the purpose specified.

CHARLES ENDORF, Jr.